(12) United States Patent
Scekic

(10) Patent No.: US 7,293,543 B1
(45) Date of Patent: Nov. 13, 2007

(54) INTEGRATED SPEED CHANGER ASSEMBLY

(75) Inventor: Vladimir Scekic, New Westminster (CA)

(73) Assignee: Toromont Energy Systems Inc., Calgary (CA)

( * ) Notice: Subject to any disclaimer, the term of this patent is extended or adjusted under 35 U.S.C. 154(b) by 0 days.

(21) Appl. No.: 11/595,877

(22) Filed: Nov. 13, 2006

(51) Int. Cl.
  *F02B 61/04* (2006.01)
(52) U.S. Cl. .................. 123/198 R; 74/572.2
(58) Field of Classification Search ............ 123/198 R; 74/572.2
  See application file for complete search history.

(56) References Cited

U.S. PATENT DOCUMENTS

| | | |
|---|---|---|
| 1,604,401 A | 10/1926 | Fisher |
| 1,903,210 A | 3/1933 | Carrier |
| 2,958,405 A * | 11/1960 | Glamann ............ 123/561 |
| 4,018,544 A | 4/1977 | Eberhardt |
| 4,281,560 A | 8/1981 | Herscovici |
| 4,346,624 A | 8/1982 | Nagasaki et al. |
| 4,687,411 A | 8/1987 | Maeda et al. |

* cited by examiner

*Primary Examiner*—Noah P. Kamen
(74) *Attorney, Agent, or Firm*—Bereskin & Parr; Isis E. Caulder

(57) ABSTRACT

An integrated speed changer assembly for increasing or decreasing the rotational speed of the output of an engine, or other prime mover, to that required by the input of a process machine. The assembly includes a housing, a flywheel assembly, an internal ring gear and a pinion. The housing has a shaft opening and a flywheel opening. The flywheel assembly is coupled to the crankshaft of an engine and positioned to substantially cover the flywheel opening of the housing. In an integrated speed increaser embodiment, the internal ring gear is coupled to the flywheel assembly and has ring gear teeth on its inner surface and is positioned concentric with the flywheel assembly for rotation therewith. The pinion has a driven shaft that extends axially and which projects through the shaft opening of the housing. The pinion has pinion gear teeth on its outer surface which are suited for meshing engagement with the ring gear teeth of the internal ring gear. In an integrated speed decreaser embodiment, the pinion is coupled to the flywheel assembly and is positioned concentric with the flywheel assembly for rotation therewith, while the internal ring gear is mounted to the driven shaft projecting through the shaft opening of the housing.

34 Claims, 8 Drawing Sheets

INTEGRATED SPEED CHANGER ASSEMBLY

TECHNICAL FIELD

This invention relates to a mechanical power transmission device, and more particularly to an integrated speed changer between an output shaft of a prime mover, such as an engine, and an input shaft of a process machine.

BACKGROUND

It is common to drive a generator, compressor, pump or other process machine with a prime mover, such as an internal combustion engine. Most internal combustion engines have a speed, or range of speeds, at which they run most efficiently, which is normally measured in revolutions per minute. Also, most engines are designed and built to rotate in one direction only, typically counter-clockwise when facing the flywheel.

In many cases, the most efficient speed of the engine is different than the rotational speed required by the process machine. In other cases, it is not practical to run the engine at the speed required by the process machine. In such cases, it is beneficial to increase or decrease the speed of the engine with external gearing, rather than to adjust the running speed of the engine. It should also be noted that most process machines are designed and built to rotate in one direction only, very often in the same direction as the engine used as the prime mover (typically clockwise when facing the input shaft of the process machine).

External gearing that increases or decreases the speed of an engine's output shaft is referred to as a speed changer and is disposed between the engine and the process machine. Speed changers feature a high parts-count, which implies lower reliability and necessitates additional maintenance-related logistics. Speed changers are bulky, inefficient and cost-prohibitive. Therefore, there is a need for a more efficient speed changer that is also integrated with the engine, or prime mover, with a view to reducing the speed changer's size, complexity, and cost.

For example, if the lubrication and cooling system of the speed changer could be integrated with the engine lubrication system, speed changer components such as heat exchangers and associated plumbing could be eliminated to reduce the device's weight and complexity. Furthermore, integration of a speed changer with the engine reduces the additional activities and costs normally associated with speed changer maintenance to only those specified for normal engine maintenance.

There is also a need for a speed changer that uses gearing with increased efficiency. Moreover, a speed changer with a smaller envelope and weight is needed to reduce material costs and improve reliability. Lower manufacturing costs would provide possibilities for the use of speed changers in applications that would not otherwise be economically feasible.

SUMMARY

In one aspect, the present invention provides an integrated speed changer assembly for increasing the rotational output speed of an engine comprising:

(a) a housing for mounting to the flywheel housing of an engine, the housing having a shaft opening and a flywheel opening;

(b) a flywheel assembly for mounting to an engine crankshaft, wherein the flywheel assembly is positioned adjacent to the flywheel opening of the housing;

(c) an internal ring gear coupled to the flywheel assembly, said internal ring gear having ring gear teeth on its inner surface and being positioned concentric with the flywheel assembly for rotation therewith;

(d) a pinion having a driven shaft extending axially and projecting through the shaft opening of the housing, said pinion having pinion gear teeth on its outer surface and adapted for meshing engagement with the ring gear teeth of the internal ring gear;

wherein, the rotational power of the flywheel assembly is transferred to the driven shaft such that in operation, the rotational speed of the driven shaft is greater than the rotational speed of the flywheel assembly.

In another aspect, the invention provides an integrated speed changer assembly for decreasing the rotational output speed of an engine crankshaft comprising:

(a) a housing for mounting to the flywheel housing of an engine, the housing having a shaft opening and a flywheel opening;

(b) a flywheel assembly for mounting to an engine crankshaft, wherein the flywheel assembly is positioned adjacent to the flywheel opening of the housing;

(c) a pinion coupled to the flywheel assembly, said pinion having pinion gear teeth on its outer surface and being positioned concentric with the flywheel assembly for rotation therewith;

(d) an internal ring gear having a driven shaft extending axially and projecting through the shaft opening of the housing, said internal ring gear having ring gear teeth on its inner surface and adapted for meshing engagement with the pinion gear teeth of the pinion;

wherein, the rotational power of the flywheel assembly is transferred to the driven shaft such that in operation, the rotational speed of the driven shaft is smaller than the rotational speed of the flywheel assembly.

Further aspects and advantages of the invention will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

Figure 1:
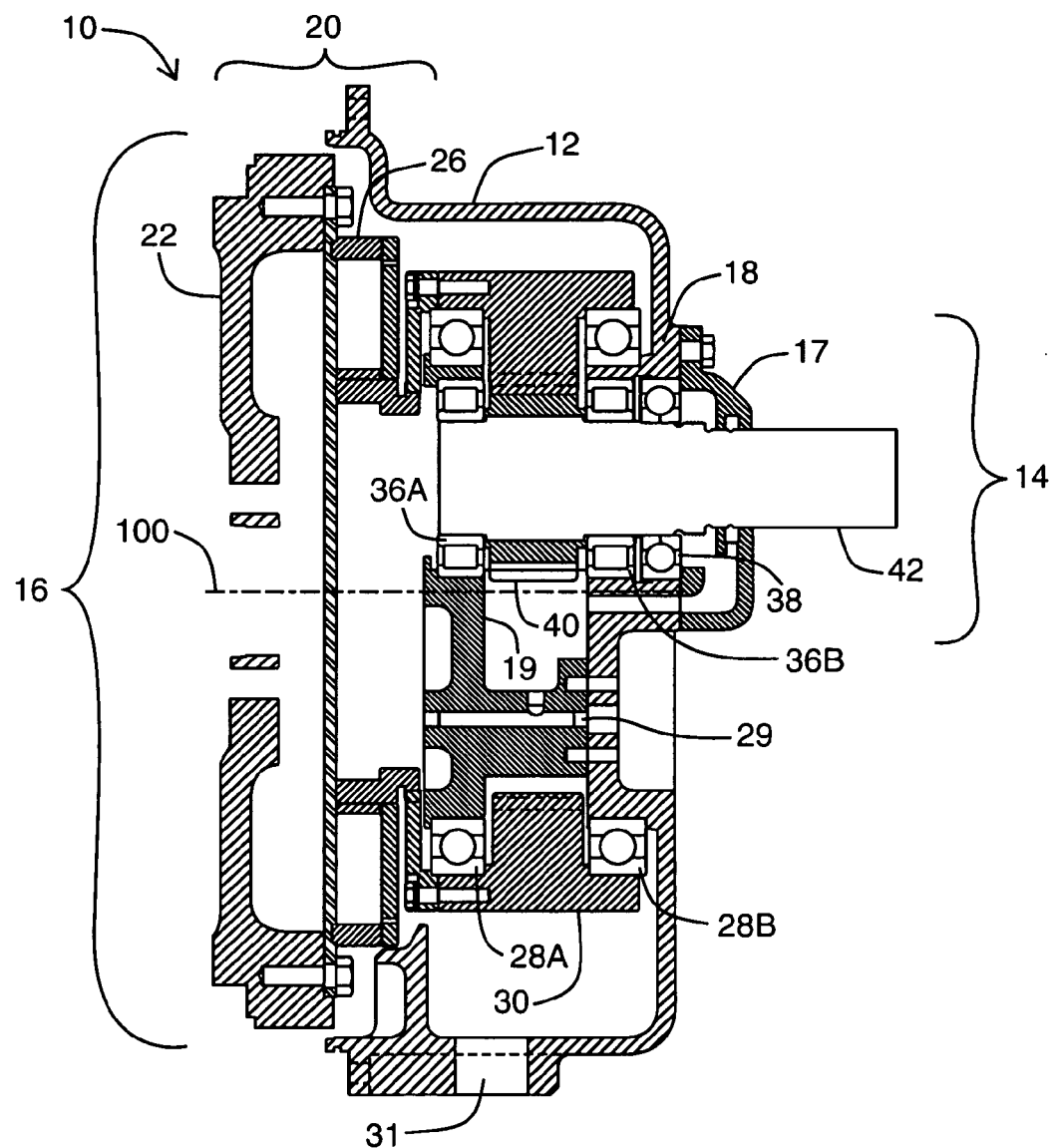
FIG. 1 is a sectional view of an integrated speed changer.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

Reference is first made to FIG. 1, which shows a sectional view of one embodiment of an integrated speed changer, integrated speed increaser assembly 10. The integrated speed increaser assembly 10 is a power transmission device that is used to increase the rotational speed of the output of an internal combustion engine (not shown) to that required by the input of a screw compressor (not shown). It will be appreciated by those skilled in the art that the integrated speed increaser assembly 10 can be used with a variety of different types of prime movers and process machines and in other industries and applications.

The integrated speed increaser assembly 10 includes a number of rotating components including a flywheel assembly 20, an internal ring gear 30, a pinion 40 and a driven shaft 42. As shown, the flywheel assembly 20 is directly attached to internal ring gear 30 as well as to the engine (not shown). Accordingly, when the engine rotates, it causes the flywheel assembly 20 also to rotate. This rotational movement is directly transferred to the internal ring gear 30, causing it to rotate at the same speed and in the same direction as the engine.

In order to provide a sealed, functional assembly, the housing 12 is attached to the flywheel housing of the engine (not shown). The flywheel housing of the engine supports the housing 12, and together the housings enclose the moving components of the integrated speed increaser assembly 10. Specifically, the flywheel housing of the engine encloses the flywheel assembly 20, which is mounted to and supported by the engine crankshaft (not shown).

The housing 12 includes a first bearing carrier 19, which supports the end of driven shaft 42 and the internal ring gear 30 through radial bearings 36A and 28A. As shown, the shaft opening 14 is positioned on the opposite side of the housing 12 from the flywheel opening 16.

The housing 12 further includes a second bearing carrier 18, which is integrally formed with the housing 12. Bearing carrier 18 supports the driven shaft 42 through a radial bearing 36B and an axial bearing 38. Bearing carrier 18 also supports the internal ring gear 30 through radial bearing 28B (FIG. 1). As described above, radial bearings 36A and 28A are supported by the first bearing carrier 19 at the end of the driven shaft 42. Typically, radial bearings 36A, 36B, 28A, and 28B are cylindrical roller bearings and axial bearing 38 is a four-point angular contact bearing. A bearing cover 17 covers an area of the shaft opening 14. Of course, it will be appreciated by those skilled in the art that this is only an example of the ways in which the internal ring gear 30 and the driven shaft 42 can be supported.

The flywheel assembly 20 is comprised of a flywheel 22, and a torsionally resilient coupling assembly 26. The flywheel 22 is rigidly mounted to the engine crankshaft (not shown). The torsionally resilient coupling assembly 26 and the internal ring gear 30 are mounted to the flywheel 22. Because the torsionally resilient coupling assembly 26 is integrated with the flywheel 22, the torque path from the engine crankshaft (not shown) to the internal ring gear 30 comprises a minimum number of components, which minimizes losses in the transfer of rotational power.

The torsionally resilient coupling assembly 26 prevents occurrence of torsional resonance in the system. In an embodiment such as shown in FIG. 1 where ring gear 30 is supported and located by the bearings 28A and 28B and the bearing carriers 18 and 19, which are ultimately supported by the housing 12, in order to prevent any damages caused by misalignment between the housing 12 and the axis of rotation of the engine crankshaft 100, the torsionally resilient coupling assembly 26 provides the misalignment point with low reaction forces. It will be appreciated by those skilled in the art that the torsionally resilient coupling assembly 26 is only one example of a means of accommodating misalignment between a gear set and a prime mover, or engine.

Engine oil from the oil gallery of the engine (not shown) may enter the integrated speed increaser assembly 10 through an oil conduit 29. In one embodiment, oil is supplied to the pinion 40, the internal ring gear 30, the flywheel assembly 20 and the torsionally resilient coupling assembly 26. Engine oil exits the integrated speed increaser assembly 10 through an oil manifold 31, and drains back to an engine sump pump (not shown) to be re-circulated. More detail about the lubrication and coolant system is provided below.

Figure 2:
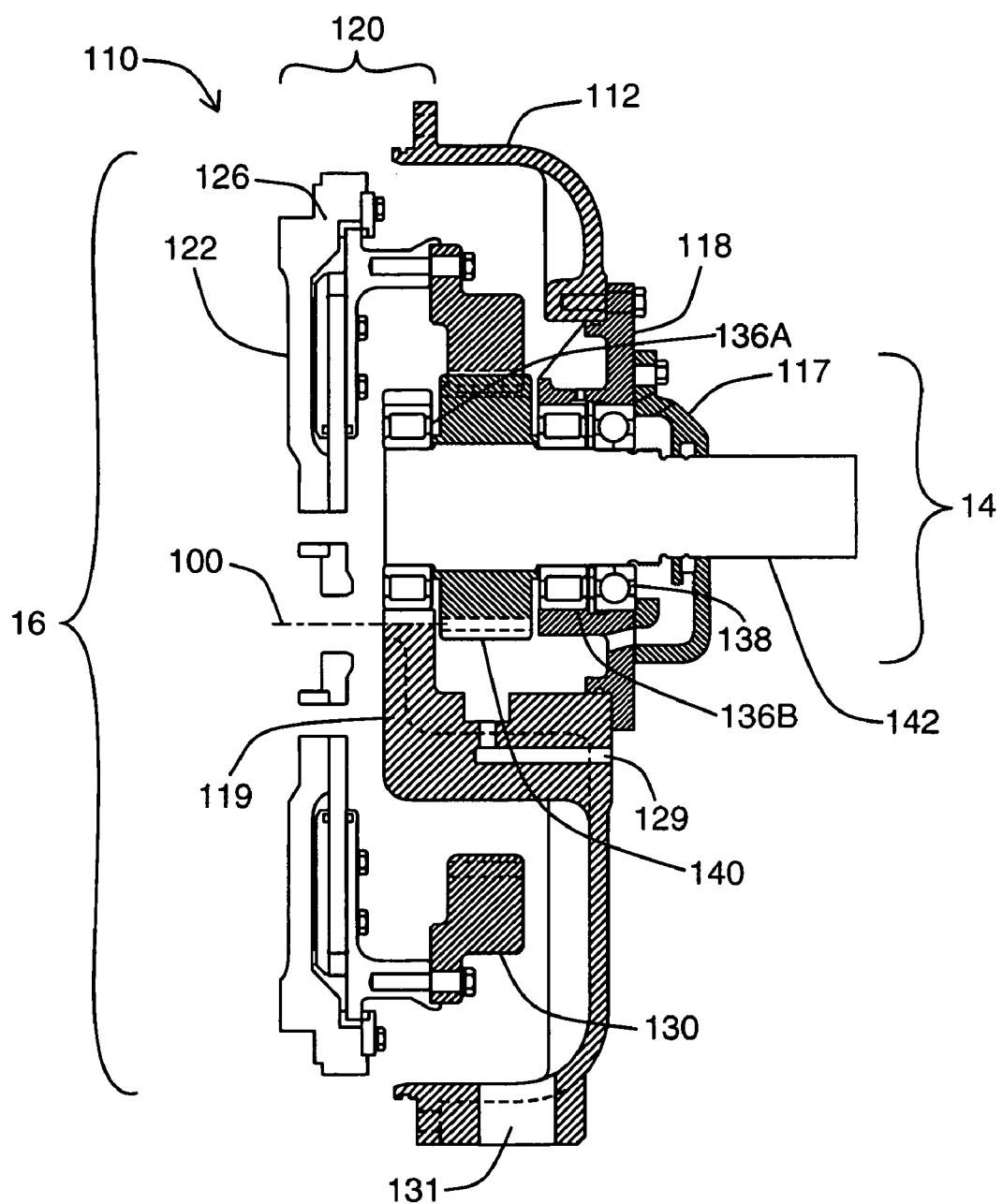
FIG. 2 is a sectional view of an integrated speed changer according to a further embodiment.

In a further embodiment, the engine crankshaft directly or indirectly supports the member of the gear set that is coupled to the flywheel assembly 20, i.e. the internal ring gear of the speed increaser embodiment or the pinion of the speed decreaser embodiment. Reference is now made to FIG. 2, which shows an embodiment of an integrated speed changer, integrated speed increaser assembly 110, wherein the internal ring gear 130 is not supported by dedicated bearings as in the previous embodiment of FIG. 1. Rather, the internal ring gear 130 is supported by the engine crankshaft and its associated bearing structure (not shown), which also locates the internal ring gear 130 for proper meshing with pinion 140.

As shown in FIG. 2, by relying on the engine crankshaft to support and locate the internal ring gear 130, the size of the overall envelope of the integrated speed increaser assembly 110 is further reduced. Furthermore, the total bearing loss of the three bearings (two radial bearings 136A, 136B and one axial bearing 138) used within the present embodiment is significantly less than if more than three bearings are used. In addition to the integration of the engine crankshaft bearings, the ability to use a small number of bearings in the integrated speed increaser assembly 110 is due in part to the small number of rotating parts necessitated as a result of use of the internal ring gear 130.

However, in order to eliminate the use of dedicated bearings 28A and 28B to support internal ring gear 130, the engine crankshaft and associated bearings structure must be built or adapted to support the additional load of the internal gear set (130, 140). However, by integrating the design of the portion of the engine crankshaft (not shown) closest to the flywheel 122 and its associated bearings structure (not shown) with the design of the integrated speed increaser assembly 110, additional savings in material cost, assembly size and weight, as well as increased reliability due to lower parts-count can be achieved. In all other aspects, speed increaser assembly 110 operates in the same manner as speed increaser assembly 10.

Figure 3:
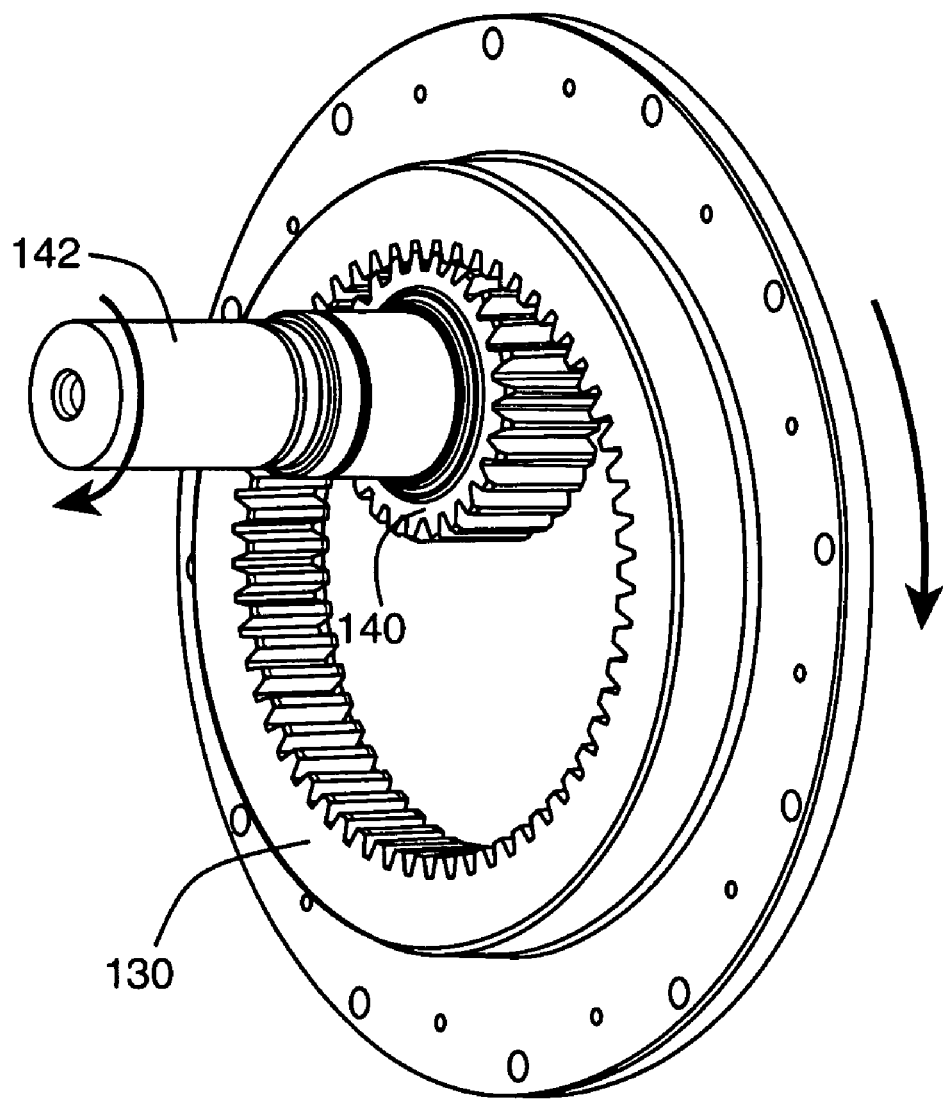
FIG. 3 is a side perspective view of the internal ring gear of FIG. 2 engaged with the pinion and the driven shaft of FIG. 2.

Reference is now made to FIG. 3, which shows that the internal ring gear 130 is meshingly engaged with the pinion 140. In turn, the pinion 140 is directly connected to the driven shaft 142. Thus, power is transmitted, in the form of rotational energy, from the engine (not shown) to the process machine (not shown) by way of the flywheel assembly 120, the internal ring gear 130, the pinion 140 and the driven shaft 142. All of these components rotate in the same direction, but the rotational speed of the driven shaft 142 will be higher than the rotational speed of the engine (not shown), the speed ratio being equal to the ratio of the number of teeth on the internal ring gear 130 to the number of teeth on the pinion 140. Each of these rotating components of the speed increaser assembly 110 is described in further detail below.

FIG. 3 shows in detail the gearing used to transfer the rotational power from the engine to the process machine. The internal ring gear 130 is characterized by an annular shape and gear teeth projecting from its inner surface. The pinion 140 is also characterized by an annular shape but has gear teeth projecting from its outer surface. Specifically, a series of gear teeth of the internal ring gear 130 are engaged (i.e. physically mesh) with corresponding gear teeth on the pinion 140. The pinion 140 is, in turn, attached to the driven shaft 142.

Due to the lower contact stresses induced by the gear-mesh of an internal gear set as opposed to an external gear set (explained in more detail below), it is possible to manufacture the internal ring gear 130 and the pinion 140 with softer materials than what is normally required of an external gear set thus lowering the manufacturing costs. As an example, the internal ring gear 130 may be manufactured from austempered ductile iron with hardness HRc 40, finish-cut to AGMA 10 quality or better. The pinion 140 may be made from carburized steel with hardness HRc 60 and ground to AGMA 11 quality or better. The minor lack of precisions in manufacturing of the internal ring gear 130 will be rectified during the run-in period of the gear set.

The internal ring gear 130 allows the integrated speed increaser assembly 110 to maintain the direction of rotation of the flywheel assembly 120 using two gears, which is the minimum number of gears possible. The two gears, namely the internal ring gear 130 and the pinion 140, rotate in the same direction, as shown by the arrows in FIG. 3. Using gears with external gear teeth requires, at a minimum, three gears to maintain the same direction of rotation, including an idler gear. Thus, the use of an idler gear is eliminated and the weight, size and complexity of the integrated speed increaser assembly 110 is reduced by employing internal ring gear 130. Furthermore, having a smaller number of components results in improved reliability.

The internal ring gear 130 is also used because internal gearing of this type is more efficient than externally toothed gears. Specifically, the efficient manner in which the teeth of the internal ring gear 130 mesh with the teeth of the pinion 140 creates a lower degree of stress and friction than the meshing of two externally toothed gears would. Specifically, internal gear teeth create less stress because the gear teeth transfer power with a higher contact ratio. A high contact ratio allows the transmission of higher torque and creates comparatively low contact stresses because the load is distributed over more teeth. As described above, due to the creation of less contact stress, the gears may be made of softer material, which can create costs savings. Furthermore, oil of lower viscosity and resistance to shear can be used, meaning that engine oil can be used instead of specialized gear oil.

Similarly, the use of the internal ring gear 130 within integrated speed increaser assembly 110 results in overall operation efficiency because internal gear teeth transfer power with more rolling contact and less sliding contact, which creates less friction and further prevents pitting. Rolling contact also creates less heat than sliding contact. Therefore, the use of internal ring gear 130 allows the integrated speed increaser assembly 110 to have a simpler cooling system with less oil-flow than would otherwise be required.

The combination of lessened lubrication and cooling requirements required by the type of gearing used in the integrated speed increaser assembly 110 allows the integration of the engine lubrication system. As discussed previously, the integrated speed increaser assembly 110 may be lubricated with oil from the oil gallery of the engine (not shown) to which it is attached.

It is common knowledge that lubricant not only lowers the coefficient of friction, but also removes heat, which is caused by energy loss due to friction and elastic bending. As a result of the nature of lubricant and the efficiencies created by using the internal ring gear 130 mentioned above, the integrated speed increaser assembly 110 does not require a separate cooling system because it can rely on the engine lubrication system for heat removal.

In the integrated speed increaser assembly 110, the oil provided acts as both a lubricant and a coolant, and additional heat exchangers and associated plumbing are not required. Furthermore, modification to the oil system of the engine is not required because the lubrication and cooling requirements are sufficiently low.

Typically, an internal combustion engine used in conjunction with the integrated speed increaser assembly 110 operates most efficiently between 1200 and 1800 revolutions per minute (RPM) and the process machine operates most efficiently between 2700 and 4000 RPM.

The integrated speed increaser assembly 110 when assembled and operational typically weighs less than 600 lbs and is no greater than 16 inches in width. Such a small size and weight allows for minimal support requirements and a lessened need for lifting equipment during assembly and maintenance.

Reference is now made to FIGS. 4A, 4B, 5A and 5B, which show side perspective views of the integrated speed increaser assembly 110. The basic functionality depicted in FIGS. 4A, 4B, 5A and 5B is also representative of integrated speed increaser assembly 10.

Figure 4B:
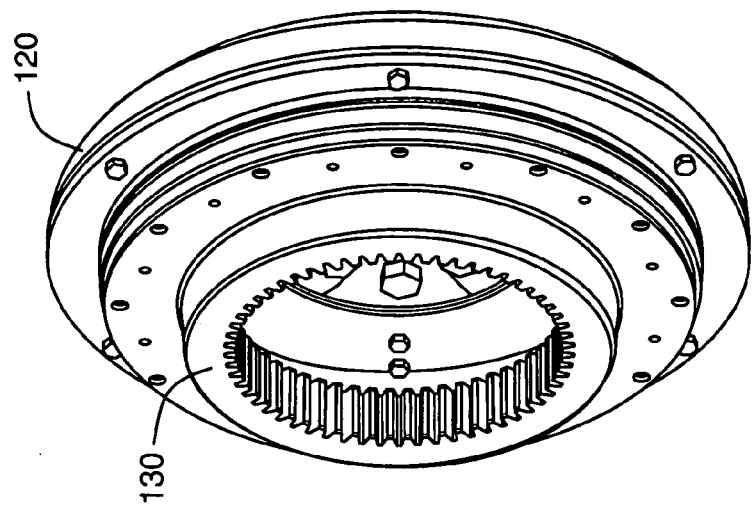
FIG. 4B is a side perspective view of the flywheel assembly and the internal ring gear of FIG. 2.
Figure 4A:
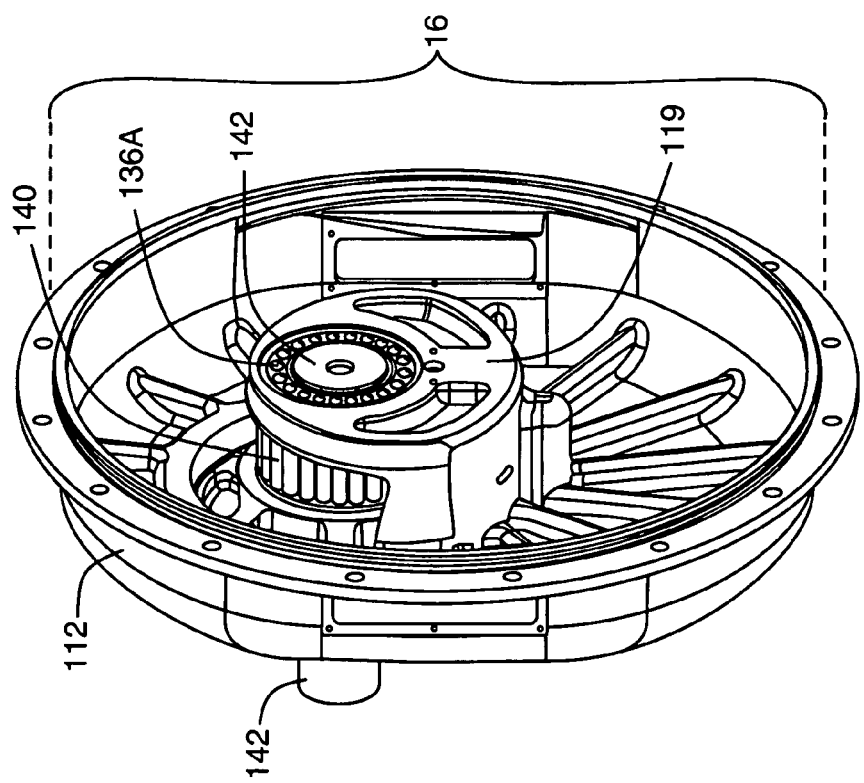
FIG. 4A is a side perspective view of the housing of FIG. 2 from the side of the flywheel opening.

FIG. 4A illustrates the inside of the housing 112 of the integrated speed increaser assembly 110 as shown through the flywheel opening 16. FIG. 4B is a side perspective view of the internal ring gear 130 and the flywheel assembly 120 of the integrated speed increaser assembly 110. As shown, the internal ring gear 130 is coupled to the flywheel assembly 120.

The two open sections are shown separated in FIGS. 4A and 4B for the purpose of clearly displaying their components. When assembled together, the two open sections substantially constitute the integrated speed increaser assembly 110. The flywheel opening 16 of the housing 112 (FIG. 4A) is positioned adjacent to the flywheel assembly 120 (FIG. 4B) such that the flywheel assembly 120 substantially covers the flywheel opening 16, leaving a small gap between the flywheel assembly 120 and the housing 112.

Typically, the integrated speed increaser assembly 110 is mounted to an engine in stages. First, flywheel assembly 120 is mounted to the engine crankshaft (not shown). The internal ring gear 130 is then temporarily meshed with pinion 140 and the entire section shown in FIG. 4A, as well as internal ring gear 130, are aligned with the flywheel assembly 120 and the flywheel housing of the engine (not shown). The flywheel housing of the engine (not shown) is secured to housing 112 using appropriate fasteners. Finally, the internal ring gear 130 is bolted to flywheel assembly 120 through access openings (not shown) located on the sides of housing 112. Of course, it will be understood by those of ordinary skill in the art that variations of this procedure could be used to mount the integrated speed increaser assembly 110 to an engine (not shown).

Figure 5B:
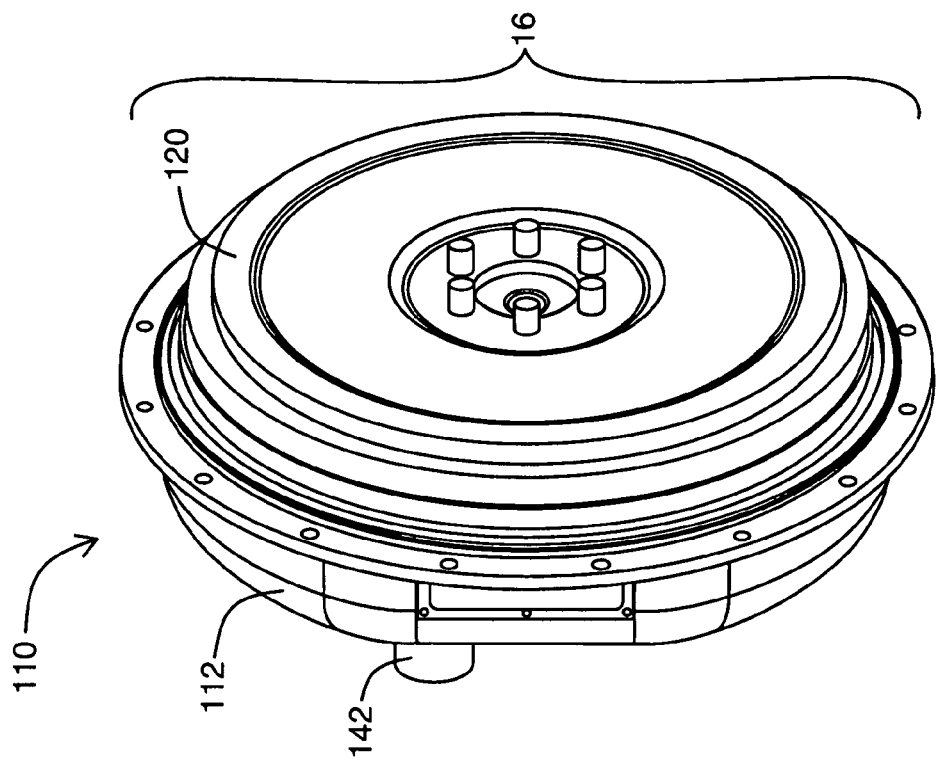
FIG. 5B is a side perspective view of the integrated speed changer of FIG. 2 in a fully assembled state from the side of the flywheel assembly of FIG. 2.
Figure 5A:
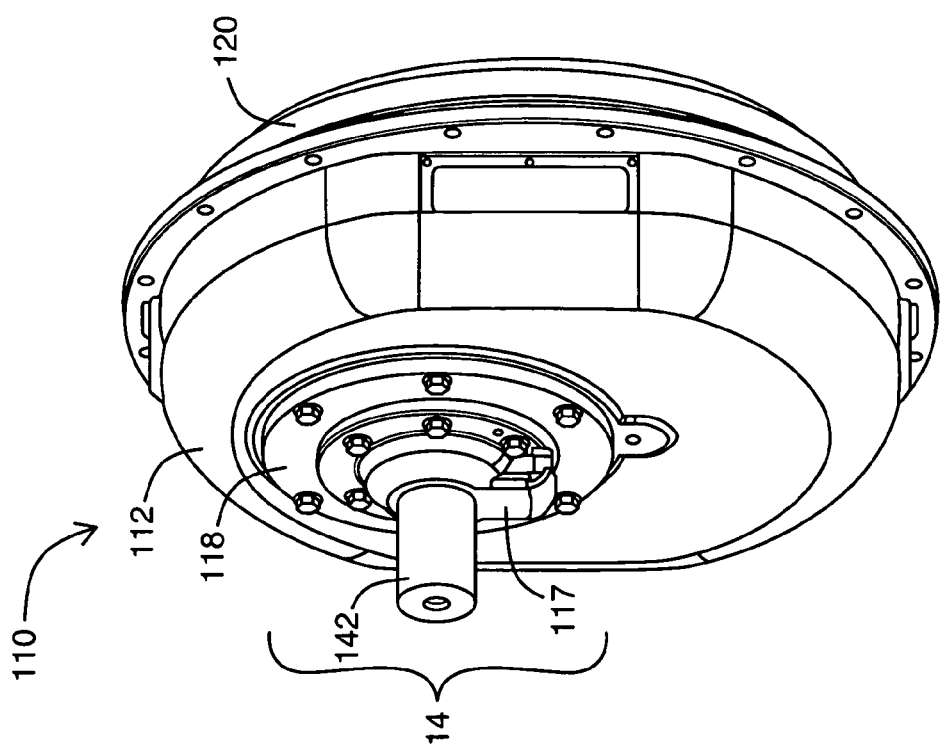
FIG. 5A is a side perspective view of the integrated speed changer of FIG. 2 in a fully assembled state from the side of the driven shaft of FIG. 2.

Reference is now made to FIGS. 5A and 5B, which show two opposite side perspective views of the integrated speed increaser assembly 110 in an assembled state. Again as shown, the shaft opening 14 is positioned on the opposite side of the housing 112 from the flywheel opening 16. The driven shaft 142 projects through a shaft opening 14. The bearing cover 117 covers the remaining area of the shaft opening 14.

Figure 6:
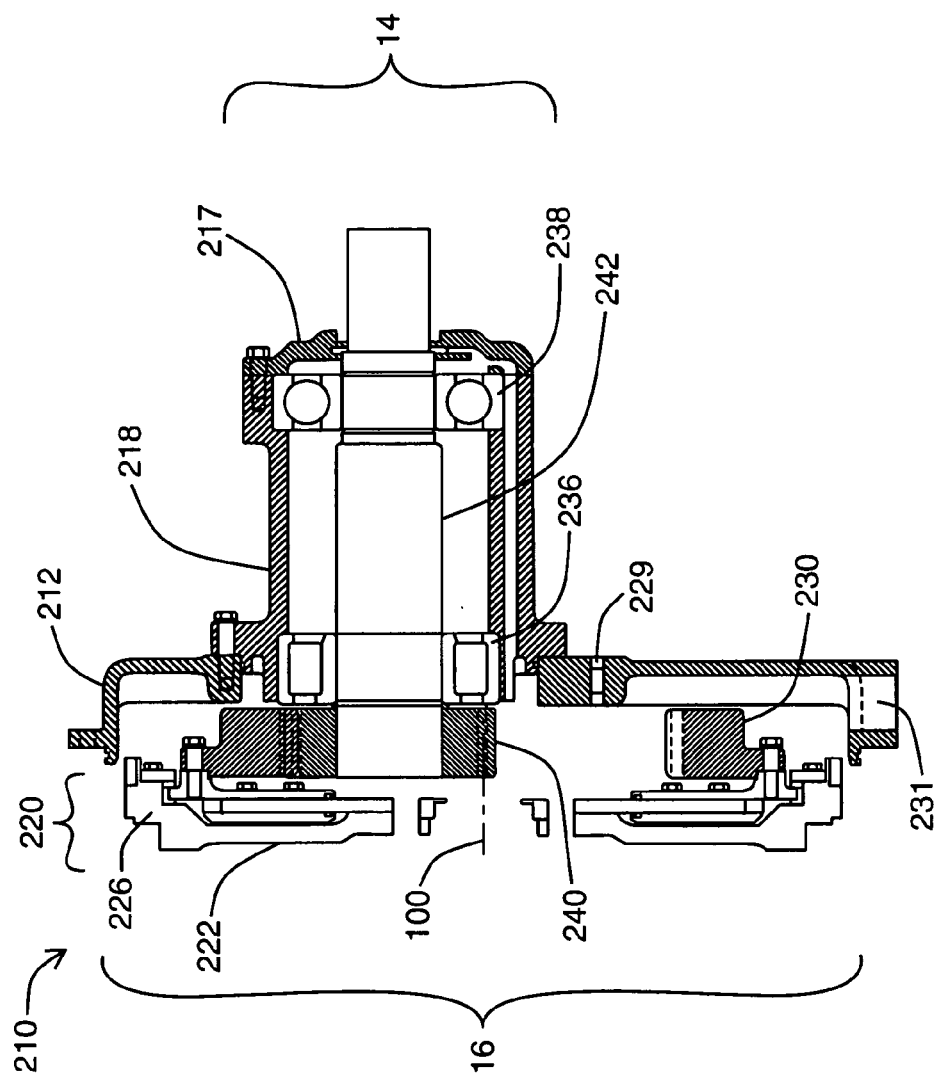
FIG. 6 is a sectional view of an integrated speed changer according to a further embodiment.

Referring now to FIG. 6, in another embodiment, speed increaser assembly 210 is designed to minimize the amount of loading transmitted to the engine crankshaft (not shown), which is induced by gear-mesh. The internal ring gear 230 is supported and located by the engine crankshaft and its associated bearings structure (not shown). By decreasing the distance between the internal ring gear 230 and the flywheel assembly 220, the moment forces on the engine crankshaft and its bearings (not shown) are reduced. This is achieved by providing additional support to the driven shaft 242 through bearings 236 and 238. As shown in FIG. 6, the bearings 236 and 238 are larger than the bearings required in the previously described embodiments, and bearing 238 is located at a position on the driven shaft 242 such that the envelope of the integrated speed increaser assembly 210 is relatively increased. Integrated speed increaser assembly 210 is an example of how the support structure for the rotating components of an integrated speed changer can be adapted to reduce the engine crankshaft loading of an integrated speed changer in which the dedicated bearings 28A and 28B for the internal ring gear 30 coupled to the flywheel assembly 20 have been eliminated. In all other aspects, speed increaser assembly 210 operates according to the same principles as speed increaser assembly 110.

Figure 7:
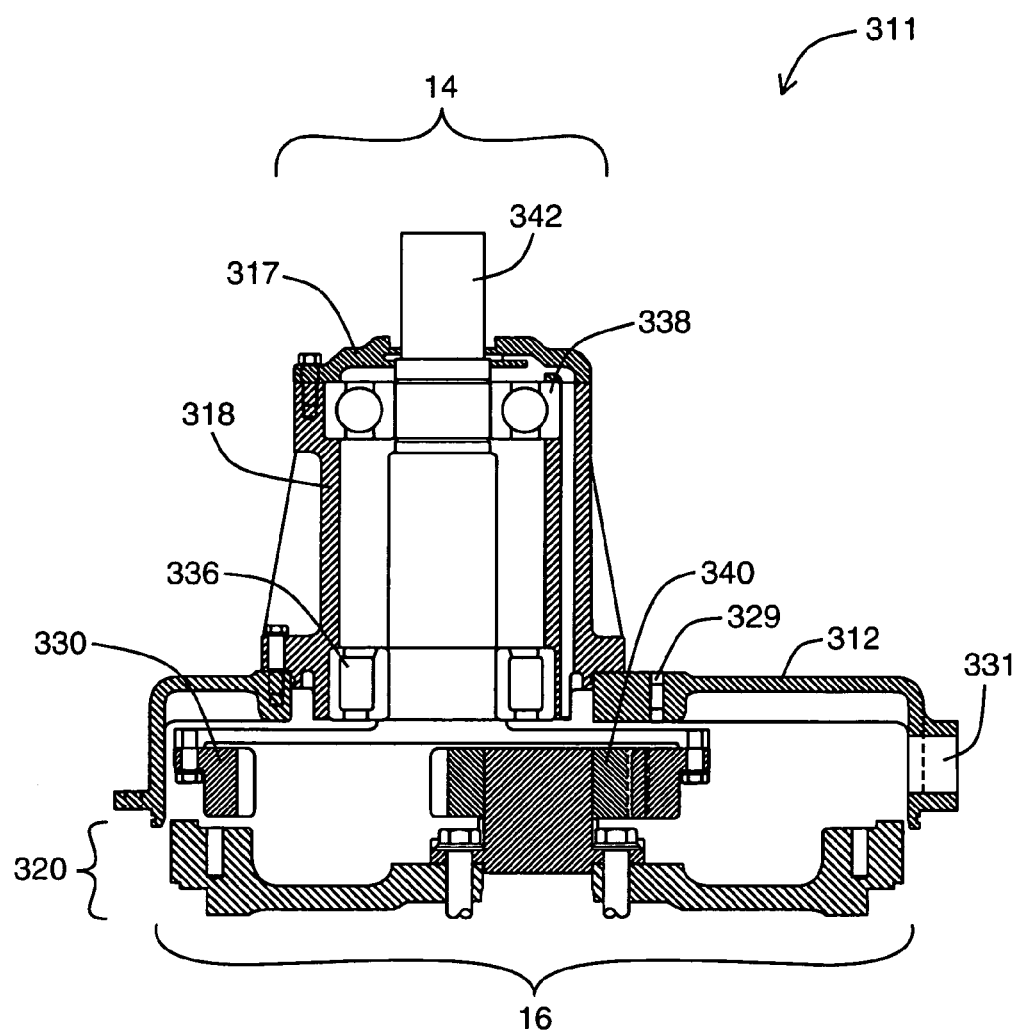
FIG. 7 is a sectional view of an integrated speed changer according to a further embodiment.

In another embodiment of the integrated speed changer, the speed changer comprises an integrated speed decreaser assembly 311. Reference is now made to FIG. 7 showing an integrated speed decreaser assembly 311 comprising the same rotational components, housing and support structure as the integrated speed increaser assembly 210 described above, but configured differently. The pinion 340 is mounted directly to the flywheel assembly 320 without any torsional coupling, while the internal ring gear 330 is mounted to a driven shaft 342. In this arrangement, the rotation speed of the driven shaft is smaller than the rotational speed of the flywheel assembly 320 and the engine crankshaft (not shown). In another embodiment (not shown), similar arrangements can be achieved with a torsionally resilient coupling assembly integrated into the flywheel assembly, or elsewhere within the system.

In another embodiment of the integrated speed changer (not shown), the housing of the integrated speed changer assembly (e.g. 12, 112, 212, 312) is integrally formed or connected with the housing of the process machine to be driven. In an embodiment (not shown), the housing of the process machine is directly attached to the flywheel housing of the engine, thereby eliminating a separate housing for the integrated speed changer assembly (e.g. 12, 112, 212, 312) and associated fasteners.

Figure 8:
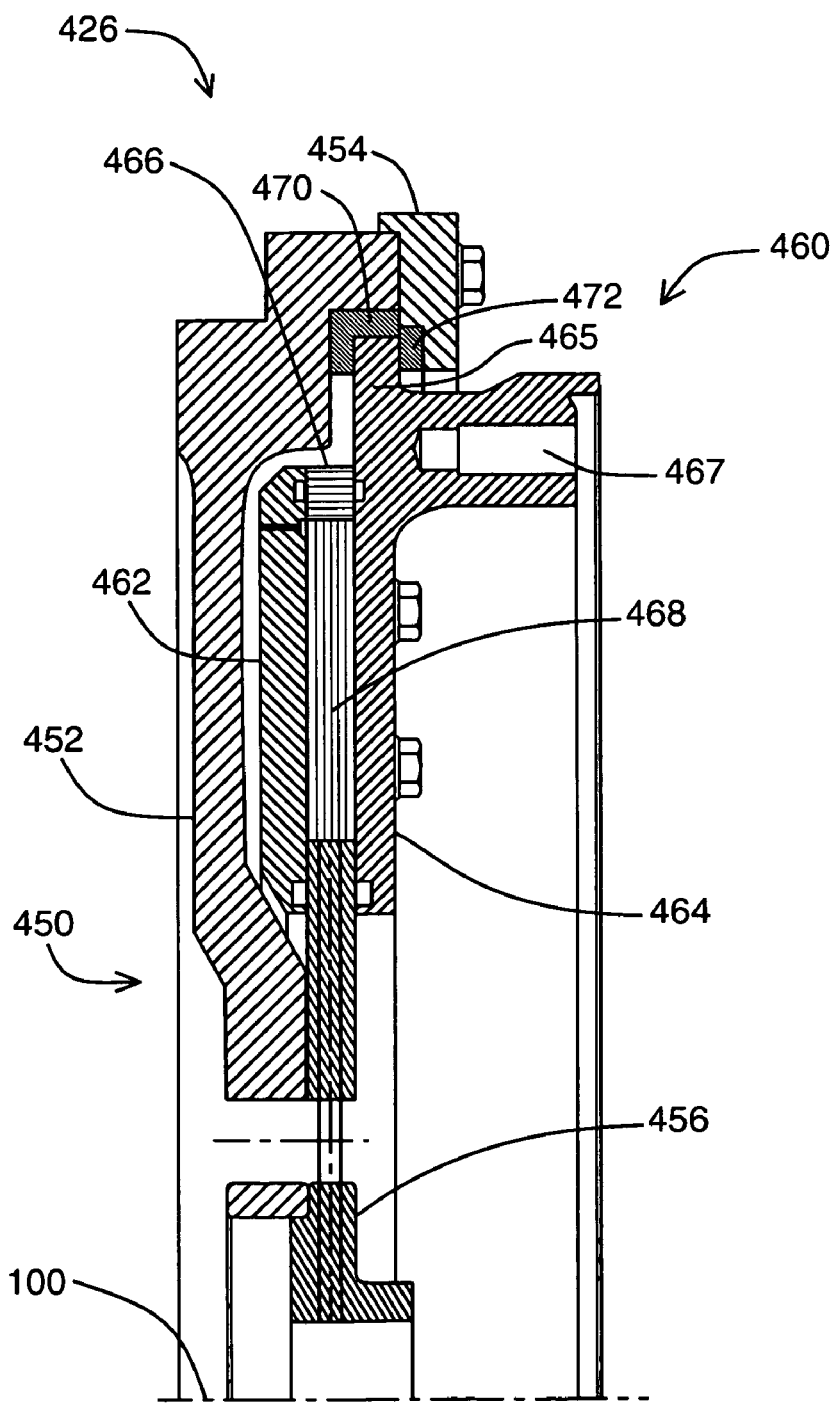
FIG. 8 is a sectional view of a torsionally resilient coupling assembly.

Reference is now made to FIG. 8, which shows a sectional view of a known torsionally resilient coupling assembly 426 that is capable of transferring radial forces from the gear-mesh of an integrated speed changer to the flywheel and crankshaft of an engine. Embodiments of a torsionally resilient coupling assembly can be seen, for example, in FIGS. 2 and 6 (126, 226) and as previously discussed in FIG. 1 (26).

The torsionally resilient coupling assembly 426 shown in FIG. 8 is a known design by Geislinger of Salzburg, Austria, herein incorporated by reference. The torsionally resilient coupling assembly 426 is designed to mount directly to the engine crankshaft (not shown) and rotate about the crankshaft axis of rotation 100. The assembly consists of unsuspended masses assembly 450 and suspended masses assembly 460. Unsuspended masses assembly 450 comprises flywheel 452, clamping plate 454, bearing assembly 470 and 472 and inner star 456. Suspended masses assembly 460 comprises side-plates 462 and 464, clamping ring 466 and spring-pack 468. The side-plate 464 features the bearing journal 465 for connection with the bearing assembly 470 and 472, and the bolt-pattern 467 for connection to the internal ring gear (not shown). The bearing assembly 470 and 472 allows the suspended masses assembly 460 to oscillate around the crankshaft axis 100 relative to unsuspended masses assembly 450 while firmly maintaining its radial and axial position in relation with the engine crankshaft (not shown).

It is by means of the bolt-pattern 467 and the bearing assembly 470 and 472 that the forces generated in the gear-mesh between the internal ring gear and pinion are transferred to the engine crankshaft (not shown) and absorbed by the crankshaft bearings (not shown), while maintaining the internal ring gear in alignment with the axis of rotation 100 of the engine crankshaft (not shown). The spring-pack 468 provides for "soft" torque transfer between the engine crankshaft and the internal ring gear thus lowering the natural frequency of the system, while vibration damping is achieved through viscous friction. Additional detail about the torsionally resilient coupling assembly 426 is not the subject of this paper. However, incorporation of a torsionally resilient coupling assembly, for example torsionally resilient coupling assembly 426, is often necessary to properly support and locate the internal ring gear of an integrated speed changer that is designed to increase the speed of the rotational output of an engine, or other prime mover.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. An integrated speed changer assembly comprising:
    (a) a housing for mounting to a flywheel housing of an engine, wherein the housing has a shaft opening and a flywheel opening;
    (b) a flywheel assembly for mounting to an engine crankshaft, wherein the flywheel assembly is positioned adjacent to the flywheel opening of the housing;
    (c) an internal ring gear coupled to the flywheel assembly, said internal ring gear having ring gear teeth on its inner surface and being positioned concentric with the flywheel assembly for rotation therewith;

(d) a pinion having a driven shaft extending axially and projecting through the shaft opening of the housing, said pinion having pinion gear teeth on its outer surface adapted for meshing engagement with the ring gear teeth of the internal ring gear;

wherein, the rotational power of the flywheel assembly is transferred to the driven shaft such that in operation, the rotational speed of the driven shaft is greater than the rotational speed of the flywheel assembly.

2. The integrated speed changer assembly of claim 1, wherein the housing is integrally formed with the housing of a process machine.

3. The integrated speed changer assembly of claim 1, wherein the flywheel assembly rotates in the same direction as the driven shaft.

4. The integrated speed changer assembly of claim 1, wherein the flywheel assembly is supported by a crankshaft bearing of an engine.

5. The integrated speed changer assembly of claim 1, wherein the flywheel assembly comprises a torsionally resilient coupling assembly and a flywheel.

6. The integrated speed changer assembly of claim 1, further comprising a lubrication system that is integrated with an engine, wherein oil is supplied from the engine and is circulated back to the engine.

7. The integrated speed changer assembly of claim 6, wherein the oil is supplied from an oil gallery of the engine.

8. The integrated speed changer assembly of claim 6, wherein oil is supplied to the flywheel assembly.

9. The integrated speed changer assembly of claim 1, wherein bearings support the driven shaft and are located on both sides of the pinion.

10. The integrated speed changer assembly of claim 9, wherein the housing further comprises at least one bearing carrier for supporting the bearings.

11. The integrated speed changer assembly of claim 1, wherein bearings support the driven shaft and are located on the side of the pinion adjacent the shaft opening of the housing.

12. The integrated speed changer assembly of claim 11, wherein the housing further comprises at least one bearing carrier for supporting the bearings.

13. The integrated speed changer assembly of claim 1, wherein the internal ring gear and the driven shaft are supported by dedicated bearings.

14. The integrated speed changer assembly of claim 13, wherein the housing further comprises at least one bearing carrier for supporting the bearings.

15. The integrated speed changer of claim 1, wherein the internal ring gear is supported by at least one crankshaft bearing of an engine.

16. The integrated speed changer of claim 15, wherein the flywheel assembly comprises a torsionally resilient coupling assembly and a flywheel.

17. The integrated speed changer of claim 1, wherein the engine is an internal combustion engine.

18. An integrated speed changer assembly comprising:

(a) a housing for mounting to a flywheel housing of an engine, wherein the housing has a shaft opening and a flywheel opening;

(b) a flywheel assembly for mounting to an engine crankshaft, wherein the flywheel assembly is positioned adjacent to the flywheel opening of the housing;

(c) a pinion coupled to the flywheel assembly, said pinion having pinion gear teeth on its outer surface and being positioned concentric with the flywheel assembly for rotation therewith;

(d) an internal ring gear having a driven shaft extending axially and projecting through the shaft opening of the housing, said internal ring gear having ring gear teeth on its inner surface adapted for meshing engagement with the pinion gear teeth of the pinion;

wherein, the rotational power of the flywheel assembly is transferred to the driven shaft such that in operation, the rotational speed of the driven shaft is smaller than the rotational speed of the flywheel assembly.

19. The integrated speed changer assembly of claim 18, wherein the housing is integrally formed with the housing of a process machine.

20. The integrated speed changer assembly of claim 18, wherein the flywheel assembly rotates in the same direction as the driven shaft.

21. The integrated speed changer assembly of claim 18, wherein the flywheel assembly is supported by a crankshaft bearing of an engine.

22. The integrated speed changer assembly of claim 18, wherein the flywheel assembly comprises a torsionally resilient coupling assembly and a flywheel.

23. The integrated speed changer assembly of claim 18, further comprising a lubrication system that is integrated with an engine, wherein oil is supplied from the engine and is circulated back to the engine.

24. The integrated speed changer assembly of claim 23, wherein the oil is supplied from an oil gallery of the engine.

25. The integrated speed changer assembly of claim 23, wherein oil is supplied to the flywheel assembly.

26. The integrated speed changer assembly of claim 18, wherein bearings support the driven shaft and are located on both sides of the internal ring gear.

27. The integrated speed changer assembly of claim 26, wherein the housing further comprises at least one bearing carrier for supporting the bearings.

28. The integrated speed changer assembly of claim 18, wherein bearings support the driven shaft and are located on the side of the internal ring gear adjacent the shaft opening of the housing.

29. The integrated speed changer assembly of claim 28, wherein the housing further comprises at least one bearing carrier for supporting the bearings.

30. The integrated speed changer assembly of claim 18, wherein the pinion and the driven shaft are supported by dedicated bearings.

31. The integrated speed changer assembly of claim 30, wherein the housing further comprises at least one bearing carrier for supporting the bearings.

32. The integrated speed changer of claim 18, wherein the pinion is supported by at least one crankshaft bearing of an engine.

33. The integrated speed changer of claim 32, wherein the flywheel assembly comprises a torsionally resilient coupling assembly and a flywheel.

34. The integrated speed changer of claim 18, wherein the engine is an internal combustion engine.

\* \* \* \* \*